US009482925B2

(12) United States Patent
Prosyk et al.

(10) Patent No.: US 9,482,925 B2
(45) Date of Patent: Nov. 1, 2016

(54) MACH-ZEHNDER OPTICAL MODULATOR WITH EMBEDDED ACTIVE ELEMENTS

(71) Applicant: Ciena Corporation, Hanover, MD (US)

(72) Inventors: Kelvin Prosyk, Ottawa (CA); Andre Hagley, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 14/444,635

(22) Filed: Jul. 28, 2014

(65) Prior Publication Data
US 2015/0036965 A1 Feb. 5, 2015

Related U.S. Application Data

(60) Provisional application No. 61/861,557, filed on Aug. 2, 2013.

(51) Int. Cl.
*G02F 1/035* (2006.01)
*G02F 1/295* (2006.01)
*G02F 1/225* (2006.01)
*G02F 1/21* (2006.01)

(52) U.S. Cl.
CPC ............. *G02F 1/225* (2013.01); *G02F 1/2255* (2013.01); *G02F 2001/212* (2013.01); *G02F 2201/127* (2013.01)

(58) Field of Classification Search
CPC .. G02F 1/225; G02F 2001/212; G02F 1/025; G02F 1/035; G02F 1/2255; G02F 1/0316; G02F 2201/126; G02F 2201/127
USPC ........................................................ 385/1–9
See application file for complete search history.

(56) References Cited

U.S. PATENT DOCUMENTS

| 5,355,422 A * | 10/1994 | Sullivan et al. ................. 385/1 |
| 2008/0089634 A1 | 4/2008 | Mosinskis et al. |
| 2009/0297088 A1* | 12/2009 | Koh ................................ 385/2 |
| 2011/0135242 A1* | 6/2011 | Prosyk ............................. 385/3 |
| 2013/0209023 A1* | 8/2013 | Prosyk ............................. 385/3 |

FOREIGN PATENT DOCUMENTS

EP 2487524 A1 8/2012

OTHER PUBLICATIONS

Walker, R.G., High-Speed III-V Semiconductor Intensity Modulators, IEEE Journal of Quantum Electronics, vol. 27 No. 3, p. 654-667, Mar. 1991.
Tsuzuki et al., 40 Gbit/s n-i-n InP Mach-Zehnder modulator with a π voltage of 2.2 V, Electronics Letters, vol. 39 No. 20, Oct. 2, 2003.
Klein et al., 1.55 μm Mach-Zehnder Modulators in InP for optical 40/80 Gbit/s transmission networks, IEEE, OFC/NFOEC, p. 171-173, 2006.

* cited by examiner

*Primary Examiner* — Kaveh C Kianni
*Assistant Examiner* — Hung Lam
(74) *Attorney, Agent, or Firm* — Osha • Liang LLP

(57) ABSTRACT

A Mach-Zehnder optical modulator is provide and has a travelling wave electrode extending over two optical waveguide branches and modulating the relative phase of the optical beam components propagating in those branches. The travelling wave electrode has transmission line conductors and pairs of waveguide electrodes, the waveguide electrodes of each pair being coupled to one of the optical waveguide branches, respectively. The travelling wave electrode further includes active devices having a high impedance input electrically connected to one of the transmission line conductors and a low impedance output electrically connected to one of the waveguide electrodes. Each active device transfers the electrical modulation signal from the associated transmission line conductor onto the associated waveguide electrode according to a voltage transfer function.

10 Claims, 11 Drawing Sheets

MACH-ZEHNDER OPTICAL MODULATOR WITH EMBEDDED ACTIVE ELEMENTS

RELATED APPLICATION

The present application is a non-provisional application of pending U.S. Provisional Patent Application titled MACH-ZEHNDER OPTICAL MODULATOR WITH EMBEDDED ACTIVE ELEMENTS, Ser. No. 61/861,557, filed Aug. 2, 2013 which is hereby incorporated by reference in its entirety into the present application.

FIELD OF THE INVENTION

The present application relates generally to the field of Mach-Zehnder optical modulators. More specifically, the present invention discloses a travelling wave Mach-Zehnder optical modulator with embedded active elements decoupling the waveguide electrode capacitance from the transmission line conductors.

BACKGROUND

Optical modulators have been employed for many years in the field of optical communications to accept modulated data in electrical format (typically radio frequency or RF) and transfer the data onto an optical carrier. In a Mach-Zehnder optical modulator 20, as generally shown in FIG. 1 (PRIOR ART), a beamsplitter 22 divides the laser light from an input optical waveguide 24 into two optical beams propagating in parallel waveguides defining optical paths 28A and 28B, at least one of which having a phase modulator in which the refractive index is a function of the strength of the locally applied electric field. In the example shown in FIG. 1, light in both optical paths 28A, 28B undergoes a phase modulation, although in other configurations the refractive index in only one of the optical paths could be modulated with respect to the other. The beams are then recombined by an output optical combiner 26. Changing the electric field on the phase modulating paths determines whether the two beams interfere constructively or destructively when recombined, and thereby controls the amplitude or intensity of the exiting light. In some configurations, the phase of the exiting light can be controlled via a variety of means such as by manipulating the phase modulation signal, or through design.

In the configuration shown in FIG. 1, the modulating electric field is provided by a segmented Travelling Wave Electrode 21 (or TWE) that consists of two or more transmission line conductors 30A, 30B oriented substantially parallel to the optical paths 28A, 28B, and a plurality of pairs of waveguide electrodes 32A, 32B. Each waveguide electrode 32A, 32B is connected to one of the transmission line conductors 30A, 30B via a corresponding tap or bridge conductor 34A, and 34B. Each bridge conductor 34A, 34B branches out of one of the transmission line conductors 30A, 30B in a direction substantially perpendicular to the optical paths 28A, 28B. The transmission line conductors 30A, 30B convey an RF signal along an RF path that is substantially parallel to the optical paths 28A, 28B.

The configuration shown in FIG. 1 can be operated in "push-pull" mode and is typically referred to as a series push-pull travelling wave electrode, after Klein et al., "1.55 μm Mach-Zehnder Modulators on InP for optical 40/80 Gbit/s transmission networks", OFC/NFOEC 2006, paper TuA2, and described in further detail by R. G. Walker, "High-Speed III-V Semiconductor Intensity Modulators", IEEE J. Quant. Elect., vol. 27(3), pp. 654-667, 1991. In a series push-pull configuration, a single voltage signal or field is used to phase modulate the interfering signals in the two arms in anti-phase. Each pair of waveguide electrodes 32A, 32B, as shown in FIG. 1, imparts a phase change to the optical wave in the waveguide 28A, 28B and also acts as a pair of capacitors in series and as a load on the main transmission line conductors 30A, 30B.

A travelling wave electrode Mach-Zehnder optical modulator can be driven using either a single RF signal input, or two RF signal inputs in anti-phase. Referring for example to FIG. 1, in a single-ended design the two transmission line conductors 30A, 30B may respectively act as a signal transmission line conductor (S) conveying the input electrical signal, and a ground transmission line conductor (G) connected to a ground reference. This modulator configuration is sometimes referred to as an SG modulator (also known as a coplanar strip). It should be noted that other types of RF drives are known in the optical telecommunications industry, requiring other arrangements of transmission line conductors in the modulator. For example, the prior art includes optical modulators with differential-drive GSGSG and GSSG formats (see for example applicant's U.S. Patent Application published under number U.S. 2013/0209023 (PROSYK) "Mach-Zehnder Optical Modulator Using A Balanced Coplanar Stripline With Lateral Ground Planes", filed on Feb. 14, 2013).

FIG. 1A (PRIOR ART) is an elevation view of section A of the optical modulator of FIG. 1, showing two pairs of waveguide electrodes 32A, 32B. Each waveguide electrode 32A, 32B extends over a p-i-n junction 36A, 36B, formed within the corresponding waveguide branch. The p-layer 38A, 38B is in contact with the corresponding waveguide electrode 32A, 32B and the n-layer 40A, 40B is in contact with a common conducting backplane 42. The i-layer 39A, 39B contains a series of layers of InGaAsP of varying composition that acts as the waveguiding core. The entire structure extends on a semi-insulating substrate 43.

When an instantaneous change is applied in the voltage difference between the transmission line conductors 30A and 30B, a RF current 44 flows from the highly p-doped contact material 38A beneath waveguide electrode 32A, through the corresponding p-i-n junction 36A and the common conducting backplane 42, and up through the opposite p-i-n junction 36B. The direct current (DC) bias voltage of the backplane 42 is typically fixed by an external DC voltage source (not shown). A simplified electrical diagram of this configuration is shown in FIG. 2. The p-i-n semiconductor layers act as capacitors 46 that are connected in series through the common conducting backplane 42. This series connection halves the required loading capacitance on the main signal transmission line conductor compared to designs with electrically-independent Mach-Zehnder arms, leading to major performance advantages with regards to bandwidth.

The capacitance C of capacitors 46 shown in FIG. 2 is a significant factor in the performance of a series push pull travelling wave electrode Mach Zehnder optical modulator. If a high capacitance can be used, both the drive voltage of the modulator and the length of the chip can be reduced, which provides advantages in terms of power consumption and chip cost, respectively. However, there is a strict limit to the maximum allowed capacitance, as depicted in FIGS. 3, 4A and 4B, and described in the following paragraphs.

FIG. 3 (PRIOR ART) shows a simplified circuit equivalent model of a travelling wave electrode, well known in the art as the "telegrapher" model. The transmission line conductors are described in this model as an infinite cascade of inductive series elements 48, expressed as an inductance per unit length, and capacitive shunt elements 50, expressed as a capacitance per unit length. The average capacitance per unit length of the capacitors 46, which represent the back-to-back p-i-n junctions of the waveguides, can be expressed as a waveguide capacitance 52 that adds in parallel to the shunt capacitance 50 of the transmission line conductors. Since the total capacitance of two capacitors in parallel is the sum of the individual capacitors, the waveguide capacitance 52 directly adds to the total shunt capacitance 50. The shunt capacitance 50, representative of the transmission line electrodes in the absence of connected waveguide electrodes, is sometimes referred to as the "unloaded capacitance" of the travelling wave electrode. The waveguide capacitance 52 added by the waveguide electrodes is sometimes referred to as the "loading capacitance".

The inductance per unit length L and total capacitance per unit length C uniquely determine the characteristic impedance $Z_0$ and RF modal index $n_{RF}$ of a travelling wave electrode, given by the equations $Z_0=\sqrt{L/C}$ and $n_{RF}=v\sqrt{LC}$, where v is the speed of light in vacuum. In other words, a travelling wave electrode can be equivalently described by either (L,C) or by ($Z_0$, $n_{RF}$). The situation is depicted graphically in FIGS. 4A and 4B as an exemplary two-dimensional mapping.

The values of ($Z_0$, $n_{RF}$) are generally fixed by the specifications that the Mach Zehnder modulator must meet. For example, as shown in FIG. 4A, it may be necessary to design the travelling wave electrode to have a characteristic impedance $Z_0$ of 50 Ohm, since that is the most common impedance of commercially produced driver amplifiers. Similarly, $n_{RF}$ is fixed by the necessity to maximize the RF bandwidth of the modulator. Bandwidth is maximized when the velocity of the RF mode is matched to the velocity of the optical mode. The velocity of the optical mode is in turn determined by the optical properties of the waveguides; for example, the typical optical group index is approximately 3.75 for modulators constructed from the compound semiconductor indium gallium arsenide phosphide, which fixes $n_{RF}$ to be approximately 3.75, as also shown in FIG. 4A.

In contrast to ($Z_0$, $n_{RF}$), the parameters (L,C) are determined by the geometrical design of the transmission line conductors and p-i-n junctions of the waveguides. Since $Z_0$ and $n_{RF}$ are both fixed by performance requirements, the values of L and C are also fixed, and therefore there is restricted freedom in choosing the design of the travelling wave electrode. For example, a specified characteristic impedance of $Z_0$=50 Ohms and a RF index of 3.75 require that the travelling wave electrode have an inductance per unit length L of 625 nH/m and a total capacitance per unit length C of 250 pF/m. The (L,C) of the transmission line conductors in the absence of waveguide electrodes and the (L,C) of the travelling wave electrode including the waveguide electrodes are shown in FIG. 4B. The difference in capacitance between the two points is the waveguide or loading capacitance.

Since the transmission line conductors cannot have an unloaded capacitance of less than zero, the requirement in this example that C=250 pF/m places a theoretical limit on the maximum waveguide loading capacitance: it cannot exceed 250 pF/m. In physically realizable transmission devices, the minimum unloaded capacitance is actually a substantial portion of the total capacitance; for example in some implementations a transmission line must have an unloaded capacitance of 125 pF/m to be practical, or about half of the target total of 250 pF/m. The finite unloaded capacitance of the transmission line places a much stricter maximum on the waveguide capacitance, and therefore severely limits the maximum performance of the modulator.

The problem becomes even greater if a higher characteristic impedance $Z_0$ is desired. Similar to a reduction in drive voltage, increasing $Z_0$ is advantageous in that is reduces driver power consumption. However, at a fixed $n_{RF}$, increased $Z_0$ results in a decreased total capacitance C. For example, another common commercial driver impedance is 100 Ohm, which gives an inductance 1250 nH/m and a capacitance of 125 pF/m when $n_{RF}$=3.75. Such a low capacitance requirement leaves little room for sufficient loading capacitance.

There is therefore a need for a Mach-Zehnder modulator design which alleviates at least some of the above-mentioned drawbacks.

SUMMARY

In accordance with one aspect, there is provided a Mach-Zehnder optical modulator for modulating an input optical beam according to an electrical modulation signal. The Mach-Zehnder modulator includes an optical structure dividing the input optical beam into two optical beam components propagating in two parallel optical waveguide branches, respectively, and recombining the optical beam components downstream the optical waveguide branches.

The Mach-Zehnder modulator further includes a travelling wave electrode extending over the optical waveguide branches and modulating a relative phase of the optical beam components. The travelling wave electrode includes transmission line conductors conveying the electrical modulation signal, and a plurality of pairs of waveguide electrodes. The waveguide electrodes of each pair are coupled to one of the optical waveguide branches, respectively. The travelling wave electrode also includes a plurality of active devices. Each active device has an input electrically connected to one of the transmission line conductors and an output electrically connected to one of the waveguide electrodes. The input has higher impedance than the output. Each active device transfers the electrical modulation signal from the associated transmission line conductor onto the associated waveguide electrode according to a voltage transfer function.

Advantageously, embodiments of the invention provide a scheme to decouple the waveguide capacitance from the transmission line conductors and thereby exceed the usual practical limit on reducing drive voltage and chip size. This scheme may also be used advantageously to amplify voltage within the travelling wave electrode of a Mach Zehnder modulator, while avoiding extensive digital circuitry intended to individually address and rigorously control the voltage at each individual waveguide electrode.

These and other advantages, features, and objects of the present invention will be more readily understood in view of the following detailed description and the drawings.

DESCRIPTION OF EMBODIMENTS

Embodiments of the invention relate to Mach-Zehnder optical modulators. As one skilled in the art will readily understand, a Mach-Zehnder modulator is a device which induces a phase shift between two components of an input optical light beam in order to modulate the optical properties of the input light beam in accordance with interferometric principles. It will be readily understood that Mach-Zehnder modulators may have a variety of configurations and that the particular configurations described herein are provided by way of example only.

The input optical beam to be modulated by Mach-Zehnder modulators according to embodiments may have any optical characteristics appropriate for the application to which is destined the optical modulator. Optical modulators are used in a variety of contexts, for example for modulating light from a continuous wave (CW) laser source with no prior modulation encoded upon it, or further modulate the phase and/or amplitude of an optical signal formed from a series of regular pulses at intervals determined by the data rate. In the latter case, since the optical signal "returns to zero" at the end of every unit interval, the format is often referred to as "RZ". In another example, an optical modulator may be used to impose a modulation on a series of pulses as above, except that consecutive pulses are 180 degrees out of phase at the optical carrier frequency. In the Fourier spectrum, this has the effect of suppressing the optical carrier component, and is sometimes referred to as a "carrier suppressed return-to-zero" or CS-RZ modulation format. Of course, it will be readily understood that the above examples are given for illustrative purposes only.

Figure 1:
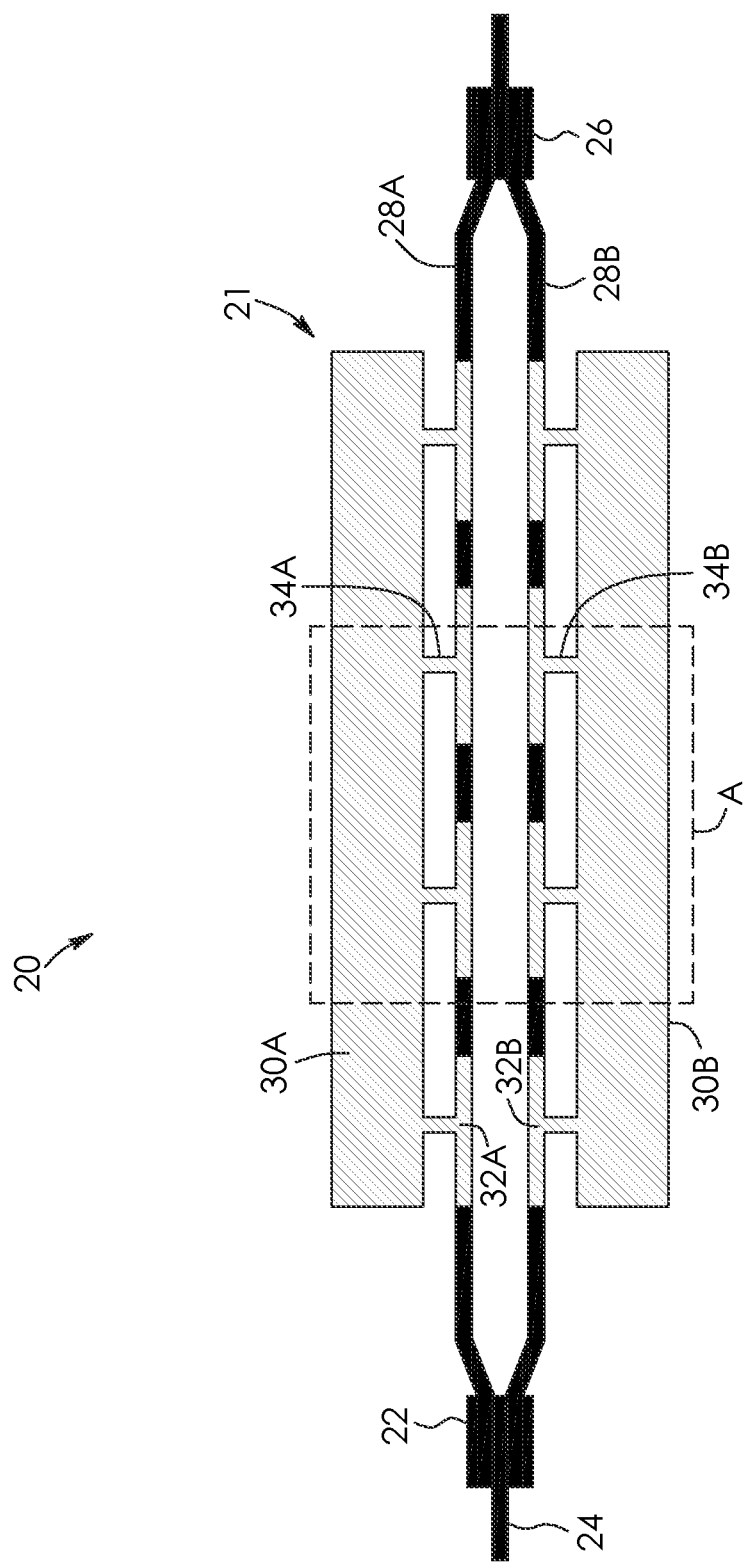
FIG. 1 (PRIOR ART) is a simplified schematic top view of a Mach-Zehnder optical modulator with a travelling wave electrode.
Figure 1A:
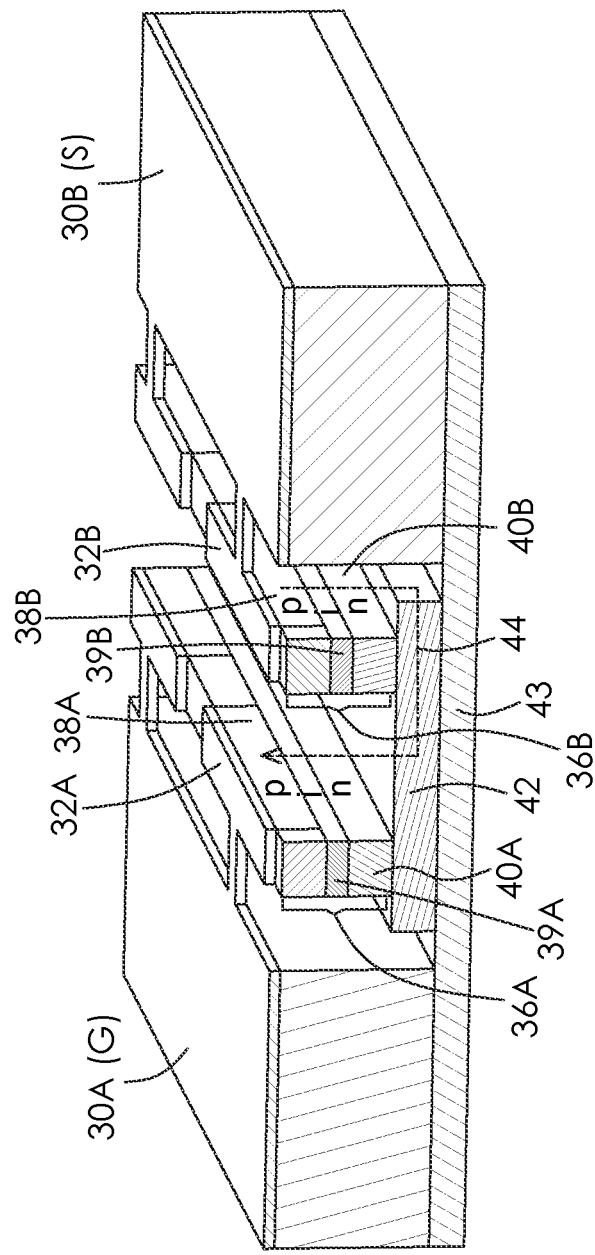
FIG. 1A (PRIOR ART) is a schematized elevation side view of a portion A of the optical modulator of FIG. 1.
Figure 2:
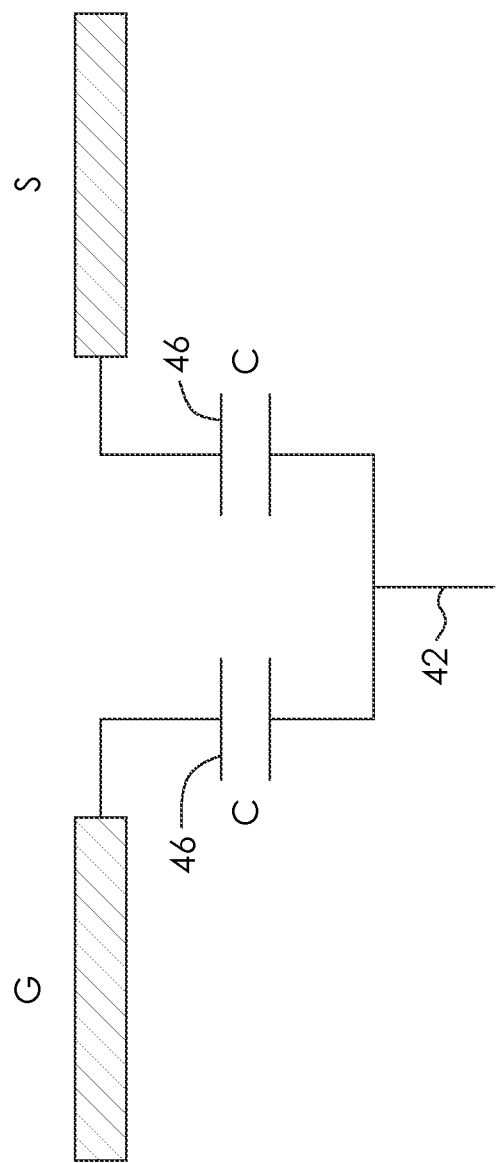
FIG. 2 (PRIOR ART) is a simplified circuit diagram associated with two pairs of waveguide electrodes of the Mach-Zehnder modulator shown in FIG. 1.
Figure 3:
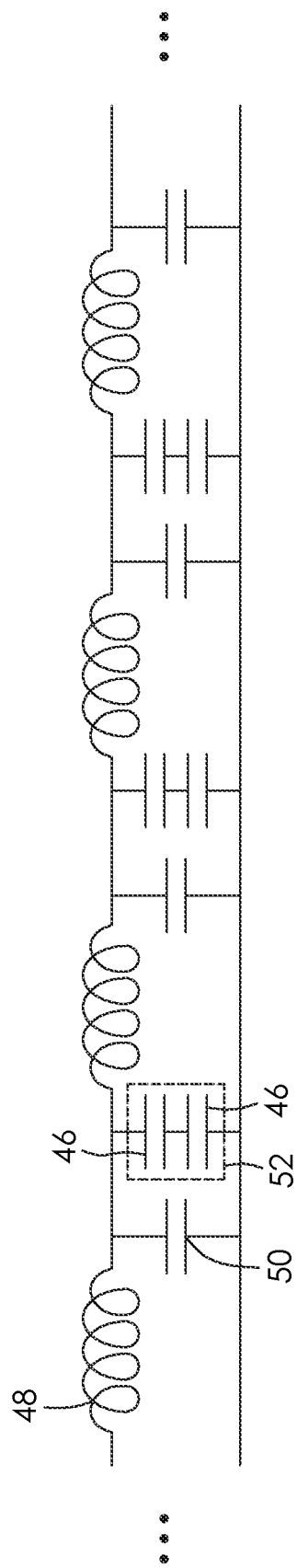
FIG. 3 (PRIOR ART) is a simplified circuit equivalent model of a series push pull travelling wave electrode.
Figure 4:
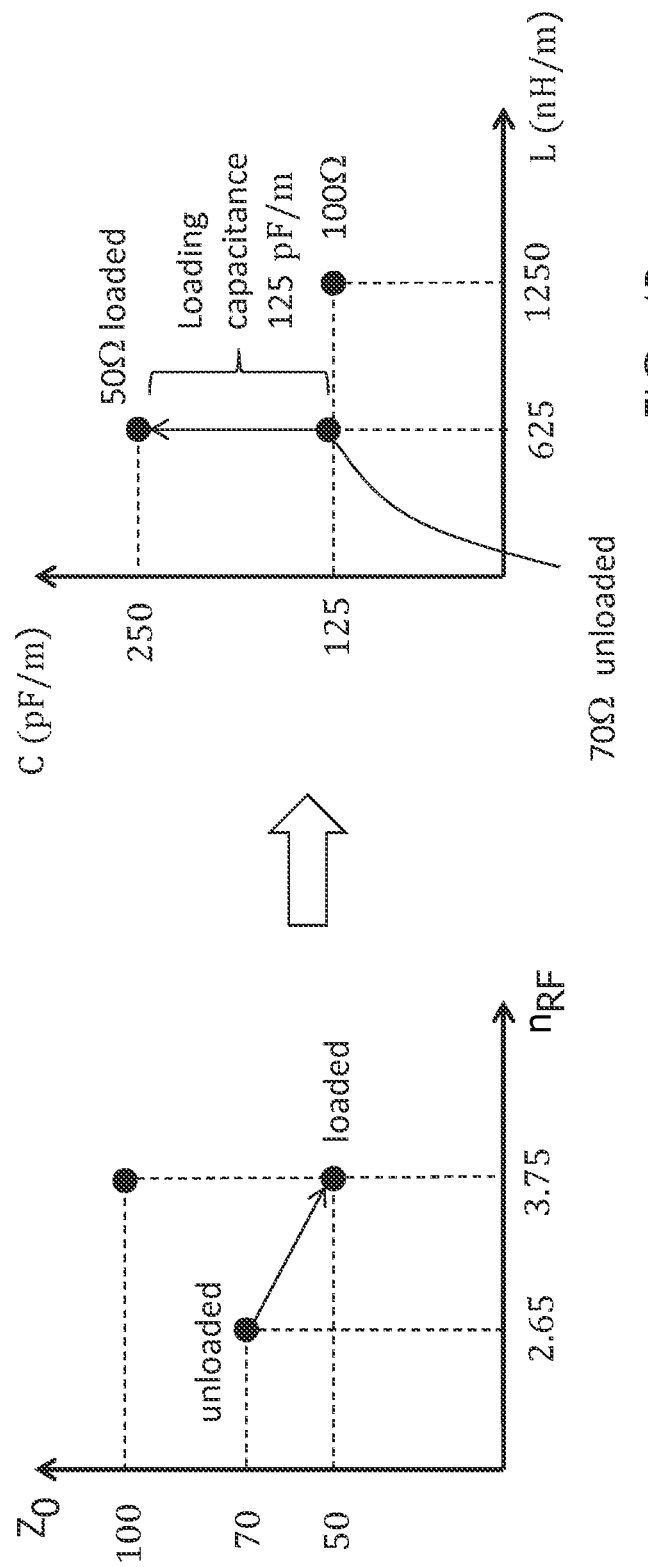
FIGS. 4A and 4B show an example of a mapping from impedance and RF modal index to inductance per unit length and capacitance per unit length of a travelling wave electrode.
Figure 5:
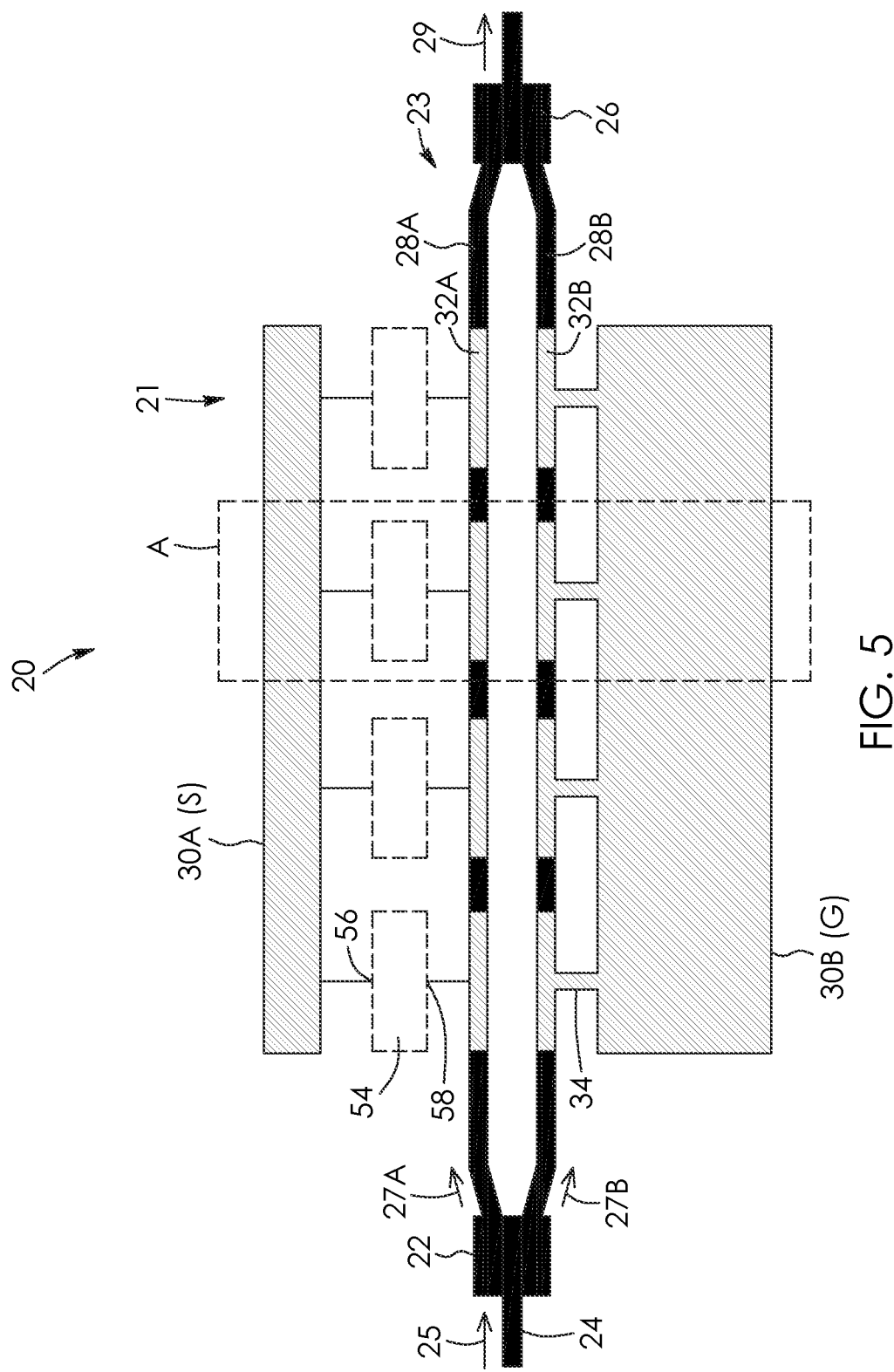
FIG. 5 is a simplified schematic top view of a Mach-Zehnder modulator in a SG configuration according to an embodiment.

With reference to FIG. 5, there is shown a schematic top view of a Mach-Zehnder optical modulator 20 according to one embodiment. The optical modulator 20 includes an optical structure 23 receiving the input optical beam 25 and dividing this input optical beam 25 into two optical beam components 27A, 27B propagating in two optical waveguide branches 28A, 28B, respectively. The optical structure 23 recombines the optical beam components 27A, 27B downstream the optical waveguide branches 28A, 28B, resulting in an output optical beam 29. In some applications, dual output optical beams can be provided. In some implementations, such as shown in FIG. 5, the input optical beam 25 is carried by an input waveguide 24, and a beam splitter 22 divides the input optical beam 25 into the two optical beam components 27A, 27B. The two optical beam components 27A, 27B are recombined after propagation through the optical waveguide branches 28A, 28B, for example by an output optical combiner 26.

In some embodiments, the optical structure 23 is defined by a semiconductor structure made of a plurality of layers patterned to provide the desired light guiding characteristics. In one example, the optical structure 23 may be defined by superposed layers of varying composition, such as the compound semiconductor indium gallium arsenide phosphide (InGaAsP) in different proportions of the constituent elements; such compositional differences result in differences in the index of refraction between the layers. The differences in index of refraction serve to confine the light in a given direction. In some embodiments, light confinement may be additionally achieved by etching away material in some regions, creating a semiconductor-to-air or dielectric-to-air interface, again resulting in an index contrast. Etched interfaces can also be covered with the application of a different material, for example etching away a portion to create a semiconductor-to-air interface, and then replacing the material that was etched away with a dielectric, to form a semiconductor-to-dielectric interface. In other implementations, superposed doped and undoped layers or differently doped layers of a same material such as lithium niobate may be provided and patterned to form ridge waveguiding constructions. As one skilled in the art will readily understand, optical structures appropriate for optical modulators may be made of a variety of materials and may be designed according to various patterns.

Typically, the beamsplitter 22 may be embodied by a multimode interference device (MMI), a directional coupler, a Y-junction splitter, or the like. In some implementations, the beamsplitter 22 divides the input light beam 25 such that the two resulting optical beam components 27A, 27B have a same optical power. Furthermore, the optical beam components 27A, 27B are coherent, that is, they have a constant relative phase.

The combiner 26 may be embodied by a MMI device or the like. A MMI relies on a transition from a narrow single mode guiding structure to a wider, multi-mode guiding structure. The multimode section is judiciously designed so that various optical modes carried by the optical waveguide branches 28A and 28B and input to the combiner 26 are combined together in the desired fashion to obtain the output optical beam 29.

Of course, it will be readily understood that the optical structure 23 may include additional components guiding, shaping or otherwise acting on the light travelling therein without departing from the scope of the invention.

The optical mode of the optical beam components 27A, 27B has an optical group index which is determined by the geometry and materials of the optical waveguide branches 28A, 28B. As is well known to those skilled in the art, the refractive index of an optical medium can be modified through the application of an electrical field. In a Mach-Zehnder configuration, this principle is used to adjust the relative phase of the optical beam components 27A, 27B guided along the optical waveguide branches 28A, 28B, thereby determining whether these optical beam components will interfere constructively or destructively once recombined into the output optical beam 29.

Still referring to FIG. 5, the Mach-Zehnder modulator 20 includes a travelling wave electrode 21 extending over the optical waveguide branches 28A, 28B and modulating the relative phase of the optical beam components 27A, 27B as they propagate along the optical waveguide branches 28A, 28B.

The travelling wave electrode 21 includes two or more transmission line conductors 30 conveying the electrical modulation signal. In FIG. 5, the transmission line conductors include one signal transmission line conductor 30A (S) conveying the electrical modulation signal inside the modulator 20. The signal transmission line conductor S preferably extends longitudinally parallel to the optical waveguide 28A along a substantial portion of the length thereof. The travelling-wave electrode 21 further includes one ground transmission line conductor 30B (G), shown coupled to the other one of the optical waveguide branches 28B. The ground transmission line conductor G provides a return path for the electrical modulation signal. The ground transmission line conductor G preferably extends longitudinally parallel to the optical waveguide branch 28B, along a substantial portion of the length thereof. The configuration illustrated at FIG. 5 therefore corresponds to a SG configuration.

In a SG configuration, the electrical modulation signal circulating in the transmission line conductors may for example be provided by an RF voltage source (not shown) having a single signal output. In other embodiments, as will be described further below, more than two transmission line conductors may be provided in a variety of configurations.

The transmission line conductors 30A, 30B may be embodied by any electrode structures of suitable shape and construction. In typical embodiments, a metallic layer is deposited over the semiconductor structure embodying the optical structure 23, and patterned to define the transmission line conductors 30A, 30B. The metallic layer may for example be made of gold, aluminum, copper, a multilayer stack comprising titanium, platinum and gold, or the like.

The travelling wave electrode 21 further includes a plurality of waveguide electrodes 32A, 32B. In the illustrated embodiment, pairs of waveguide electrode 32A, 32B are provided, and each waveguide electrode 32A, 32B of a given pair is coupled to one of the optical waveguide branches 28A, 28B, respectively. By "coupled" it is understood that the waveguide electrodes 32A, 32B are disposed relative to the corresponding optical waveguide branch 28A, 28B such that the propagation of the electrical modulation signal along the travelling wave electrode 21 generates a local electrical field within the optical waveguide branches 28A, 28B suitable to affect their refractive index, thereby changing their light transmission properties in accordance with the electrical modulation signal. As mentioned above, this allows a change in the relative phase of the optical beam components directly related to the electrical modulation signal. In the illustrated design, the waveguide electrodes 32A, 32B extend directly over the corresponding waveguide branch. Each waveguide electrode 32A, 32B is also electrically connected to either the signal transmission line conductor S or to the transmission ground line G, as explained in more detail below.

The Mach-Zehnder modulator 20 can be operated in "push-pull" mode, where a single voltage signal or field is used to phase modulate the optical beam components 27A, 27B in the two waveguide branches 28A, 28B in anti-phase. In a series push-pull configuration, each pair of waveguide electrodes 32A, 32B also act as a pair of capacitors in series and as a load on the corresponding transmission line conductors S and G, as explained above. The Mach-Zehnder modulator 20 further includes a conductive backplane 42 (see FIG. 5A) extending underneath the optical waveguide branches 28A, 28B and the travelling wave electrode 21.

The conductive backplane 42 provides an electrical signal path for the electrical modulation signal between the waveguide electrodes of each pair. In other words, the conductive backplane 42 connects the waveguide electrodes of a given pair in series.

The Mach-Zehnder modulator 20 further includes a plurality of active devices 54. Each active device has an input 56 electrically connected to the signal the transmission line conductors 30A and an output 58 electrically connected to one of the waveguide electrodes 32A. In the illustrated embodiment active devices 54 are provided between the signal transmission line conductor 30A (S) and the associated waveguide electrodes 32A only, the ground transmission line conductor 30B (G) being electrically connected to the associated waveguide electrodes 32B through bridge conductors 34. In other embodiments, active devices may additionally be provided between the ground transmission line conductor 30B (G) and the associated waveguide electrodes 32B. The input 56 of each active device 54 has higher impedance than the corresponding output 58. Each active device transfers the electrical modulation signal from the associated transmission line conductor 30A, 30B onto the associated waveguide electrode 32A, 32B according to a voltage transfer function.

The expression "active device" is understood in this context to refer to a component or group of components configured so as to perform the voltage transfer function as required by a given embodiment. The voltage transfer function can be embodied by any function resulting in the desired electrical potential being applied to the waveguide electrodes in view of the electrical modulation signal carried by the transmission line conductor.

The active device may be comprised of various gain elements including but not limited to Heterojunction-Bipolar-Transistors (HBTs), High-Electron-Mobility-Transistors (HEMTs), Metal-Semiconductor-Field-Effect Transistors (MESFETs), along with any required passive components such as thin-film resistors and Metal-Insulator-Metal (MIM) capacitors, electrical transmission lines, and inductive elements including but not limited to spiral inductors and/or interconnect lines.

Figure 5A:
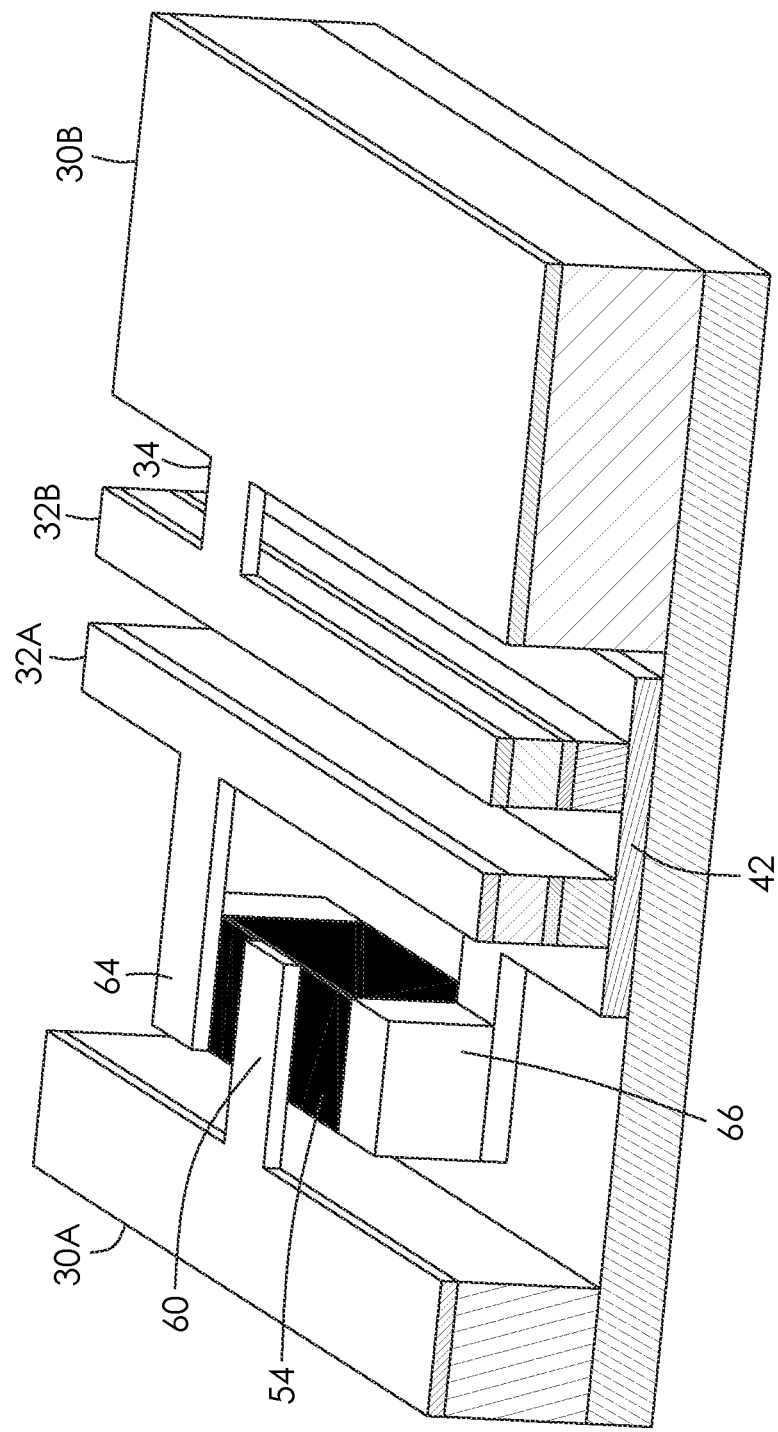
FIG. 5A is a schematized elevation side view of a portion A of the optical modulator of FIG. 5.

FIG. 5A is a schematized elevation side view of a portion A of the optical modulator shown in FIG. 5. An interconnecting voltage tap 60 extends from the signal transmission line conductor 30A to the input of the corresponding active element 54, shown here as black boxes for generality. A waveguide electrode interconnection 64 extends from the output of each active element 54 to the corresponding waveguide electrode 32A. A backplane interconnection 66 extends from the each active element 54 to the backplane 42. The other waveguide electrode 42B of each pair is for connected to the ground transmission line conductor 30B through a bridge connector 34.

Figure 6:
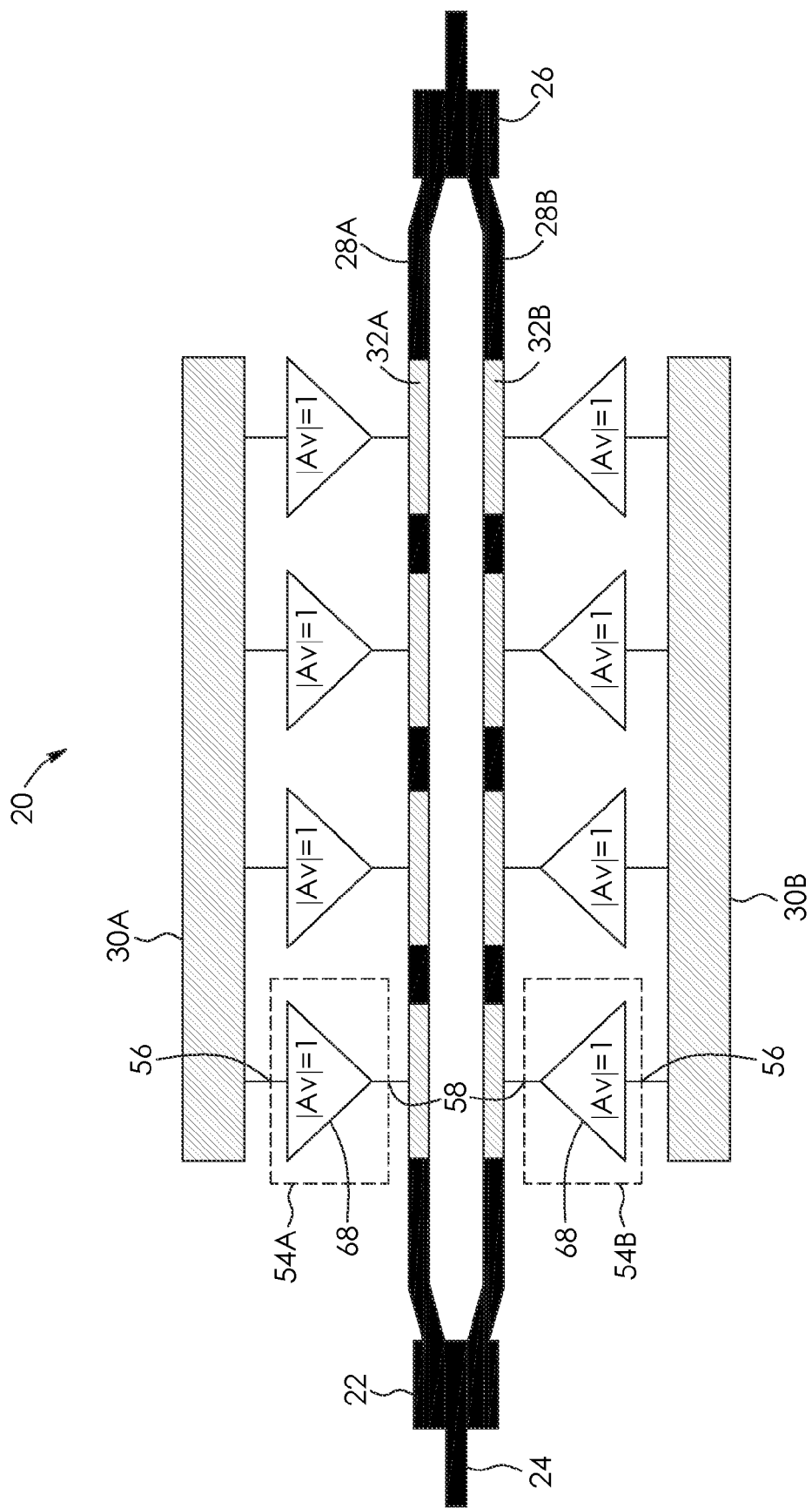
FIG. 6 is a schematic top view of a Mach-Zehnder modulator according to one embodiment where each active element includes a voltage follower.

Referring to FIG. 6, there is shown one embodiment of a travelling wave electrode in a SG configuration, where active devices 54A, 54B are provided along both the signal transmission line conductor 30A and the ground transmission line conductor 30B. In this embodiment, each active device 54A, 54B may for example include a voltage follower 68, having a high impedance input and a low impedance output. As will be readily understood by one skilled in the art, a voltage follower can be used to transfer a voltage between circuits having different impedance levels while keeping the value of the transferred voltage the same, that is the voltage gain $|A_v|=1$. Hence, voltage followers are also known as unity gain amplifiers. In such a case, the voltage at the output of the active device $V_{out}$ can for example be expressed as $$V_{out}=V_{in}\exp[i\phi(V_{in})]$$

where $V_{in}$ is the voltage at the input of the active device and $\phi(V_{in})$ is a phase delay imposed by the active device which can be voltage-dependent. The voltage gain $A_V$ (or voltage transfer function) may be expressed as $$A_V=\exp[i\phi(V_{in})]$$

and therefore $$|A_V|=1.$$

The function of the voltage follower 68 is to reduce or eliminate the capacitive loading on the transmission line conductors 30A, 30B by presenting them with a high impedance, while still providing the instantaneous RF voltage of the electrical modulation signal to the waveguide electrodes 32A, 32B, thus isolating the transmission line conductors 30A, 30B from the capacitive loading of the p-i-n semiconductor layers. The unity gain of the voltage follower 68 in this case ensures that the modulation of the optical signal remains the same as it would be if the transmission line conductors were directly connected to the waveguide electrodes. As a result, the parameters of the electrical transmission conductors 30A, 30B may be optimized independently of the optical waveguide loading. As will be readily understood by one skilled in the art, each voltage follower 68 in this embodiment may be embodied by any device capable of producing a unity voltage transfer function, while maintaining an input capacitance smaller than that of the optical waveguide connection.

Figure 7:
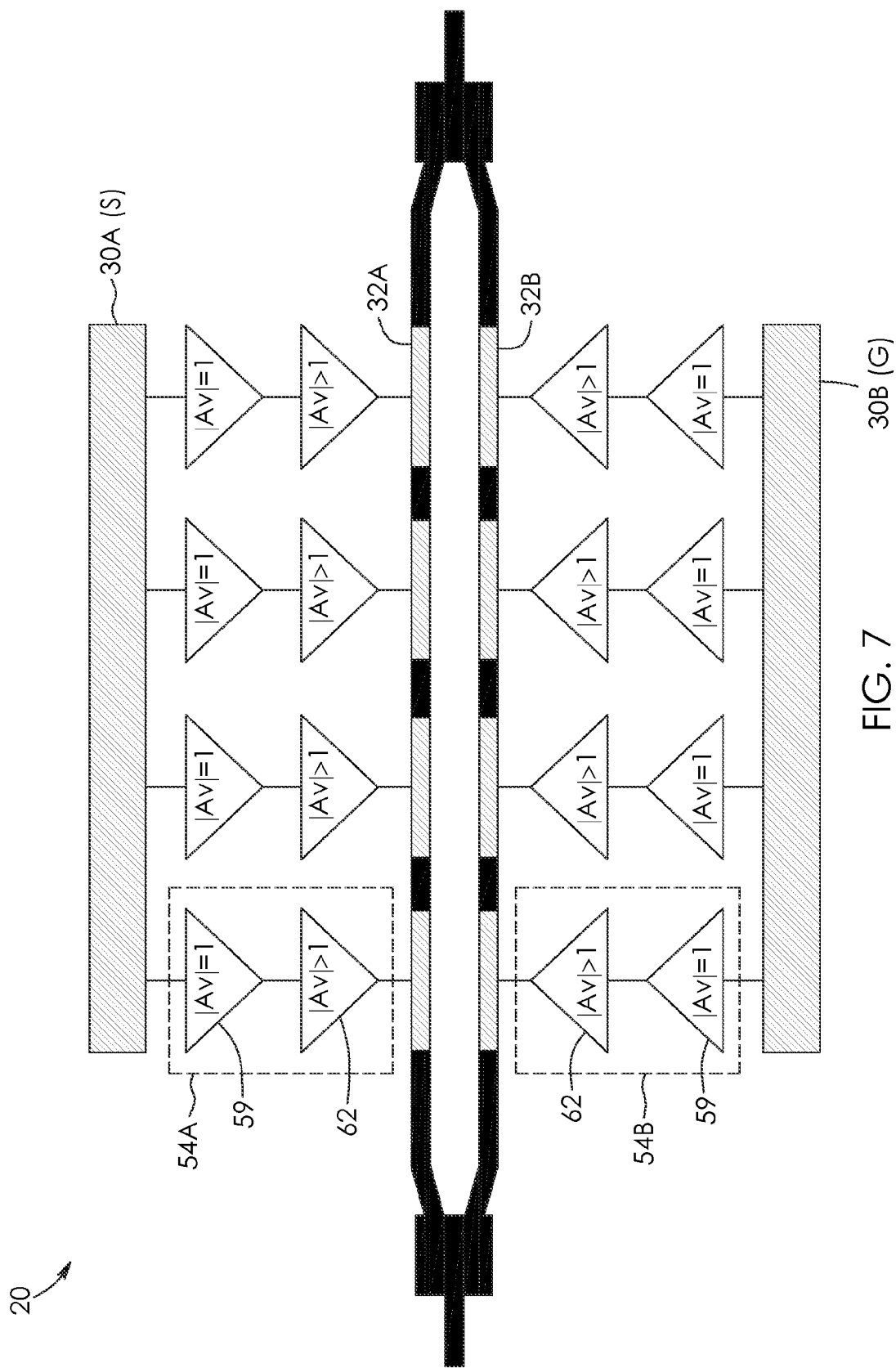
FIG. 7 is a schematic top view of a Mach-Zehnder modulator according to one embodiment where each active element includes a voltage follower and an amplifier.

With reference to FIG. 7, there is shown another embodiment of a Mach-Zehnder optical modulator 20. This embodiment is similar to that of FIG. 6, with the exception that the active devices 54A, 54B each include both a voltage follower 59 and an amplifier 62. The addition of an amplifier 62 can advantageously provide a larger magnitude of voltage to the waveguide electrode 32A, 32B than is tapped from the transmission line conductor 30A, 30B. The voltage gain of the amplifier 62 is therefore greater than unity, that is, $|A_v|>1$.

The voltage transfer function in such a case may be obtained from:

$$V_{out}=V_{in}|A_V(V_{in})|\exp[i\phi(V_{in})]$$

here $|A_v|>1$ for a suitable range of the input voltage $V_{in}$.

An ideal amplifier might have a phase and magnitude gain that is largely indpendent of the input voltage so that $$V_{out}=V_{in}\times A_V$$

where $A_v$ is a real number greater than 1.

It is to be noted that for the purpose of the present mathematical representation $Vi_{in}$ and $V_{out}$ should be considered as a wave at an isolated frequency. A practical signal however typically consists of a spectrum of frequencies and in general the transfer function $A_v$ is also frequency dependent.

The amplifier 62 may be embodied by any device, assembly or circuit apt to provide the desired voltage gain. By providing the amplifier 62 downstream the voltage follower 59, the advantages of lower capacitive loading can be maintained while at the same time additionally providing a voltage gain which is distributed along the length of the travelling wave electrode. Distributing the gain along the length of the modulator and embedding the distributed gain elements directly within the travelling wave electrode can provide advantages in terms of minimizing the lost power due to resistive interconnections normally required in the prior art.

It will readily be understood that variations could be applied to the designs described herein in order to further optimize the modulator for lower power consumption or provide further advantageous signal conditioning functions, in addition to the advantages derived from loading capacitance isolation and distributed gain described above. For example, in some implementations the number of active devices may vary compared to the number of waveguide electrodes associated with a given transmission line conductor, for example associating an active device with every other waveguide electrode. Active devices may also be distributed non-uniformly along a transmission line electrode. It is to be noted that the waveguide electrodes may themselves be distributed in a non-uniform manner and need not be all of a same length and shape. In other implementations, Different active devices of a same modulator may be designed to have different voltage transfer functions, or a voltage transfer function that can be adjusted via a DC control voltage.

Figure 8:
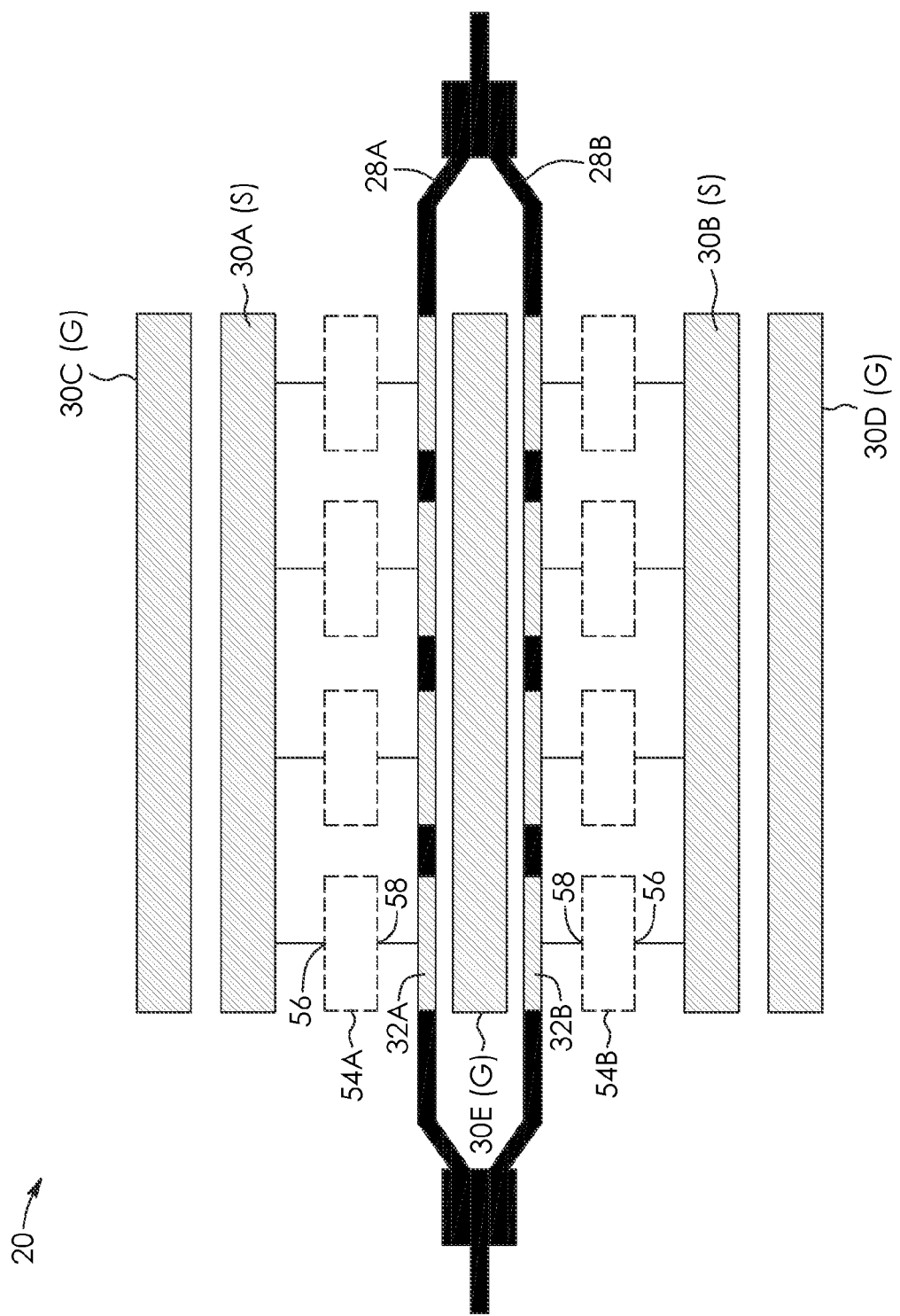
FIG. 8 is a simplified schematic top view of a Mach-Zehnder modulator in a GSGSG configuration according to an embodiment.

With reference to FIG. 8, there is shown another embodiment of a Mach-Zehnder optical modulator. In this embodiment, the Mach-Zehnder modulator 20 defines a GSGSG configuration which does not provide a push-pull modulation scheme. The modulator 20 includes two signal-carrying transmission line conductors 30A(S) and 30B(S), extending parallel to the optical waveguides 28A and 28B, with the optical waveguides interposed between the signal-carrying transmission line conductors 30A, 30B. Three ground transmission line conductors 30C(G), 30D(G) and 30E(G) are also provided, respectively on the sides of the transmission line conductors 30A, 30B opposite the waveguide electrodes 32A, 32B and between the two series of waveguide electrodes 32A, 32B.

The Mach-Zehnder modulator of FIG. 8 also includes a plurality of active devices 54A, 54B interposed between at least one of the signal-carrying transmission line conductors 30A, 30B and each of the plurality of waveguide electrodes 32A, 32B. Each of the plurality of active devices 54A, 54B has an RF input 56 and a RF output 58, the input 56 electrically connected to a transmission line electrode 30A, 30B and the output 58 electrically connected to a waveguide electrode 32A, 32B. The active devices 54A, 54B replicate the instantaneous RF signal from the transmission line conductors 30A, 30B onto the waveguide electrode 32A, 32B, thereby acting as a voltage tap. The active devices 54A, 54B may include voltage followers as explained above and optionally amplifiers as also explained above. Moreover, the input of each active device 54A, 54B has higher impedance than its output, so that the input capacitance as seen by the transmission line conductors is lower than the capacitance of the waveguide electrodes.

Figure 9:
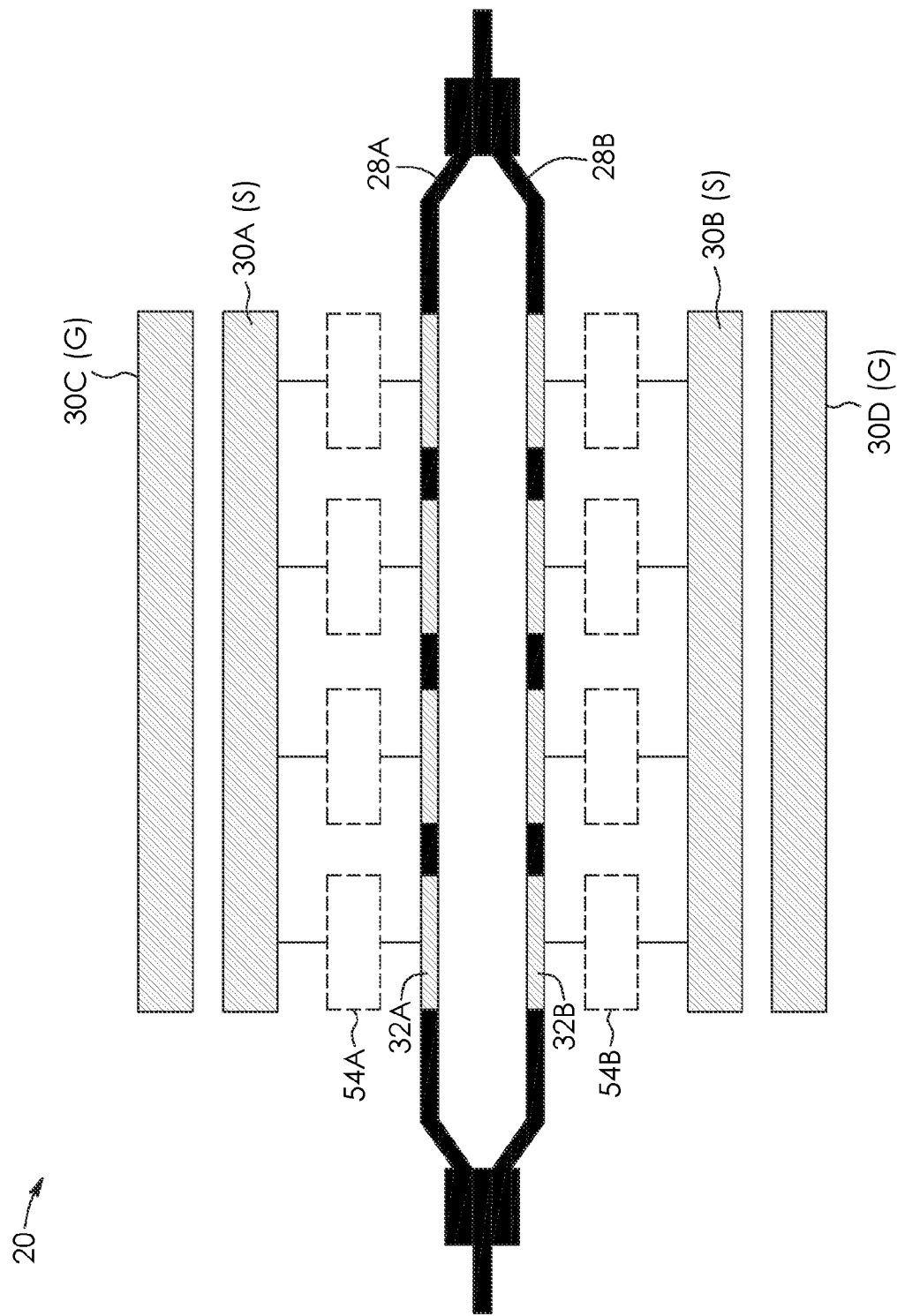
FIG. 9 is a simplified schematic top view of a Mach-Zehnder modulator in a GSSG configuration according to an embodiment.

Referring to FIG. 9, there is shown an embodiment of a Mach-Zehnder modulator 20 having transmission line conductors comprise two signal transmission line conductors 30A, 30B and two ground transmission line conductors 30C, 30D in a GSSG configuration such as for example described in U.S. Patent Application published under number U.S. 2013/0209023 (PROSYK), the entire contents of which are incorporated herein by reference. Such a device may be driven in a differential push-pull mode. Active devices 54A, 54B may be provided between each waveguide electrode 32A, 32B and the corresponding signal transmission line conductor 30A, 30B as explained above.

Those skilled in this art will appreciate that various changes, modifications, other structural arrangements, and other embodiments could be practiced under the teachings of the present invention without departing from the scope of the invention as defined in the appended claims.

The invention claimed is:

1. A Mach-Zehnder optical modulator for modulating an input optical beam according to an electrical modulation signal, the Mach-Zehnder modulator comprising:
   an optical structure dividing the input optical beam into two optical beam components propagating in two parallel optical waveguide branches, respectively, and recombining said optical beam components downstream the optical waveguide branches; and
   a travelling wave electrode extending over the optical waveguide branches and modulating a relative phase of the optical beam components, said travelling wave electrode comprising
   a plurality of transmission line conductors conveying the electrical modulation signal;
   a plurality of waveguide electrodes coupled to one of the two parallel optical waveguide branches; and
   a plurality of active devices disposed between the plurality of transmission line conductors and the plurality of waveguide electrodes,
   wherein the plurality of active devices comprises an active device having an input electrically connected to a transmission line conductor from the plurality of transmission line conductors and an output electrically connected to a waveguide electrode from the plurality of waveguide electrodes,
   wherein the input of the active device has a higher impedance than the output of the active device,
   wherein the active device transfers the electrical modulation signal from the transmission line conductor onto the waveguide electrode according to a voltage transfer function, and
   wherein the active device is configured to decouple a capacitance of the waveguide electrode from contributing to a capacitance of the traveling wave electrode.

2. The Mach-Zehnder optical modulator according to claim 1, wherein each active device comprises a voltage follower.

3. The Mach-Zehnder optical modulator according to claim 2, wherein each active device further comprises an amplifier in series with said voltage follower.

4. The Mach-Zehnder optical modulator according to claim 1, wherein one of said active devices is associated with each of said waveguide electrodes.

5. The Mach-Zehnder optical modulator according to claim 1, wherein the plurality of transmission line conductors comprise a signal transmission line conductor S and a ground transmission line conductor G in a SG configuration.

6. The Mach-Zehnder optical modulator according to claim 5, wherein the plurality of active devices connect the signal transmission line conductor S to the plurality of waveguide electrodes.

7. The Mach-Zehnder optical modulator according to claim 1, wherein the transmission line conductors comprise two signal transmission line conductors S and two ground transmission line conductors G in a GSSG configuration.

8. The Mach-Zehnder optical modulator according to claim 1, wherein the transmission line conductors comprise two signal transmission line conductors S and three ground transmission line conductors G in a GSGSG configuration.

9. The Mach-Zehnder optical modulator according to claim 1, wherein the travelling wave electrode is driven in a series push-pull mode.

10. The Mach-Zehnder optical modulator according to claim 1, wherein the travelling wave electrode is driven in a differential series push-pull mode.

* * * * *